United States Patent [19]

Persson

[11] 3,945,905

[45] Mar. 23, 1976

[54] ELECTROLYTIC CELL
[75] Inventor: Adrian Persson, Palo Alto, Calif.
[73] Assignee: Raymond Lee Organization Inc., New York, N.Y.; a part interest
[22] Filed: Nov. 20, 1974
[21] Appl. No.: 525,566

[52] U.S. Cl. .................. 204/212; 204/95; 204/149; 204/272; 204/273
[51] Int. Cl.² ........................ C25B 1/24; C25B 1/26
[58] Field of Search ............ 204/95, 149, 212, 215, 204/216, 272, 273

[56] References Cited
UNITED STATES PATENTS

| | | | |
|---|---|---|---|
| 699,907 | 5/1902 | Atkins | 204/215 |
| 2,399,289 | 4/1946 | Negus | 204/149 UX |
| 2,530,524 | 11/1950 | Hlavin | 204/216 X |
| 3,718,540 | 2/1973 | Bailey | 204/272 |

*Primary Examiner*—T. Tung
*Assistant Examiner*—A. C. Prescott

[57] ABSTRACT

A fixed, hollow, cylindrical, open ended electrically conductive cathode concentrically surrounds a hollow, cylindrical, electrically conductive anode. The anode is fixed upon an electrically conductive axle so as to allow the anode and axle to rotate inside the cathode. Electrically non-conductive brushes are mounted on the anode and rotate therewith, sweeping over the radially inner surface of the cathode. A water inlet housing at one end of the cathode and a water exhaust housing at the other end of the cathode cooperate to divert a stream of water in which salt has been dissolved between the anode and the cathode, the housings also supporting the conductive axle and allowing it to rotate. An electric motor rotates the axle.

5 Claims, 5 Drawing Figures

ELECTROLYTIC CELL

BACKGROUND OF THE INVENTION

Electrolytic cells are conventionally used to chlorinate water for swimming pools and the like, by decomposing salts such as sodium chloride dissolved therein. In the process of producing chlorine gas, chlorine bubbles form on the cathode of such a cell, and it has been found desirable to wipe such bubbles off the cathode as they are produced, to maximize bare cathode surface area presented to the water and thus facilitate chlorine production. In U.S. Pat. No. 2,530,524 an electrolytic cell is shown with a revolvable electrode and stationary wipers. This device uses alternating current to decompose water, thus causing each electrode in the device to alternately function as cathode and anode. In addition, a monel electrode body is used, this body being subject to deterioration and necessitating the cutting of grooves to insure that an adequate electrode surface area is always presented to the water. The present invention differs radically from that shown in the above mentioned patent in that it has rotatable wiper blades, uses no monel electrode and consequently has no grooves, and uses direct current.

SUMMARY OF THE INVENTION

This invention resides in the use of a hollow cylindrical cathode concentrically surrounding a cylindrical anode, the anode being rotatable and carrying brushes that sweep the inner surface of the cathode free of chlorine bubbles as they form. The invention further resides in the angling of the brushes to allow them to function as turbine vanes, and thus cause the anode to rotate under the influence of water passing through the invention.

This invention is specifically intended for use with water in which sodium chloride is dissolved, although its use is not limited thereto. Such water is routed through the elongated annular volume between two concentric cylindrical electrodes. The outer electrode, which is the cathode in this design, is fixed, while the inner electrode (or anode) is rotatable about its axis. Non-conductive brushes are fixed to the surface of the anode, and sweep across the radially inner surface of the cathode.

When a direct current source is placed across the anode and cathode, the salt-laden water flowing between them is electrolyzed, and chlorine bubbles form on the inside of the cathode. As the anode rotates, the brushes sweep the cathode clear of bubbles, keeping a maximum surface area presented to the water and facilitating chlorine production.

DETAILED DESCRIPTION OF PREFERRED EMBODIMENTS

Figure 1:
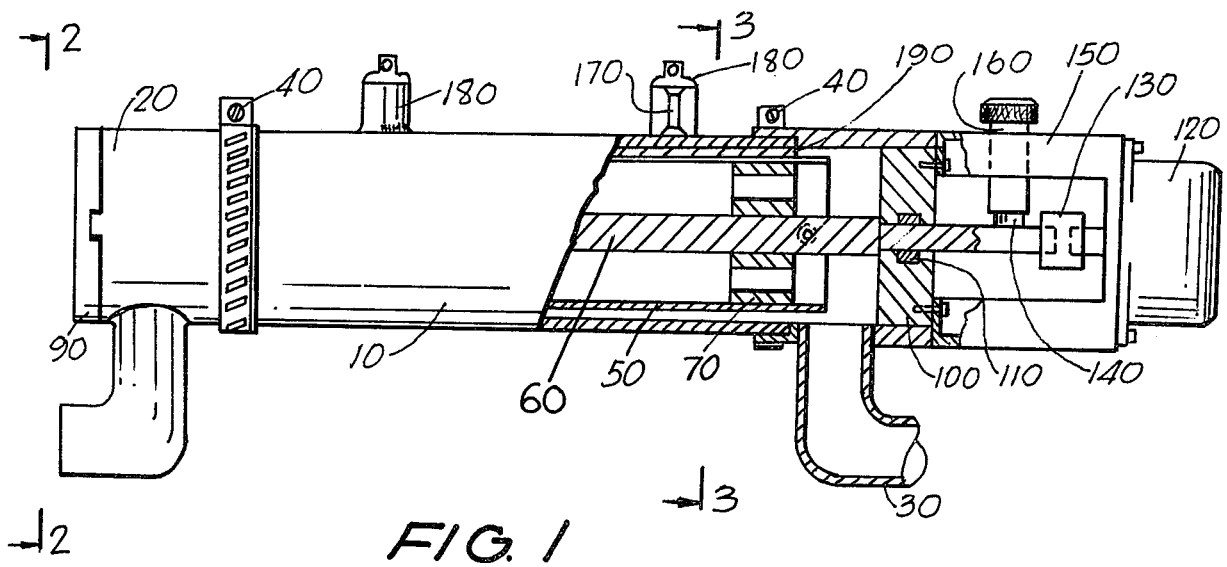
FIG. 1 is a drawing of the invention, with a cutaway portion showing construction details.
Figure 2:
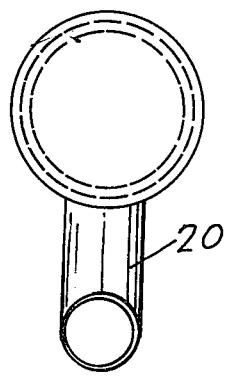
FIG. 2 is a view along line 2—2 in FIG. 1.
Figure 3:
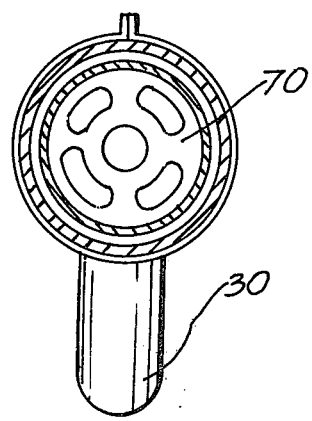
FIG. 3 is a view along line 3—3 in FIG. 1.
Figure 4:
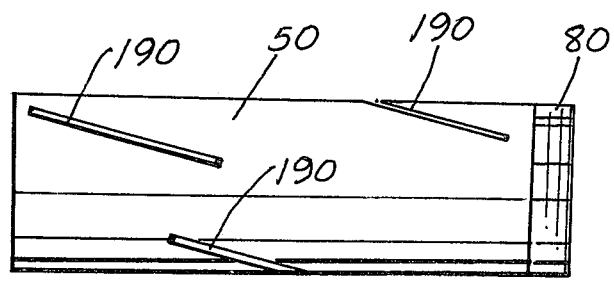
FIG. 4 is a drawing of the anode and the brushes disposed thereon.
Figure 5:
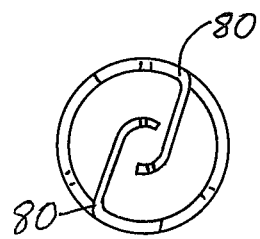
FIG. 5 is a drawing showing the anode-axle connectors.

A hollow, cylindrical copper cathode 10 has open ends to which a water intake housing 20 and a water exhaust housing 30 are attached by clamps 40. Inside the cathode is disposed a hollow cylindrical titanium anode 50 which bears a platinum coating. The cathode and anode are concentric, the latter being free to rotate inside the former on electrically conductive axle 60. The axle is attached to the anode by two like cylindrical plastic plugs 70 placed in the ends of the anode. To make electrical contact between the axle and anode, two like opposed electrically conductive anode axle connectors 80 are biased against the axle and are attached to the anode.

Plastic plugs 90 and 100 are placed in housings 20 and 30. Plug 90 has a cylindrical recess in which one end of axle 60 is placed, while plug 100 has a central hole through which the axle extends. This hole is fitted with seal 110, to prevent water escaping from the region between the cathode and anode into electric motor 120, which rotates the axle through insulator 130, and is attached to housing 30.

To connect the anode and cathode in circuit with a 5 volt direct current source, a carbon brush 140 touches the axle, the brush being placed in holder 160 in motor housing 150. Two rectifiers 170 in holders 180 are connected to the exterior of the cathode.

When water in which 1% sodium chloride has been dissolved is inducted into the elongated annular space between the anode and the cathode and 5 volts is placed across the anode and cathode, electrolysis decomposes the sodium chloride and chlorine bubbles form on the radially inner surface of the cathode. To wipe the surface of the cathode clear of bubbles and thus facilitate chlorine production, three teflon wiper brushes 190 are attached to the outside of the rotating anode. These brushes are inclined 40 degress of arc with respect to the axis of the anode, so that water under high pressure that is inducted into the device will press against the blades and rotate the anode. The motor exists to rotate the anode only when the water pressure is not sufficient to do so.

It has been found that the resistance of the cell is sufficiently low so as to allow twenty to thirty amperes to pass through water containing 1% sodium chloride, when 5 volts have been placed across the cell. The distance between the anode and cathode in this embodiment of the invention is ⅛ inch.

While the invention has been described with detailed reference to the drawings, the protection sought is to be limited only by the terms of the claims which follow.

I claim:

1. An electrolytic cell comprising:
   a fixed hollow cylindrical open ended electrically conductive cathode;
   an electrically conductive axle rotatable about its axis and aligned with the axis of the cathode;
   a hollow cylindrical open ended electrically conductive anode disposed between and spaced from the cathode and axle, the axle being aligned with the axis of the anode;
   electrically nonconductive plugs disposed between the anode and axle to mechanically connect the anode and axle whereby the axle and anode rotate as a unit, said plugs having openings to permit passage of water therethrough;

electrically conductive connectors biased against the axle and attached to the anode to electrically connect the axle and anode;

a plurality of electrically nonconductive brushes disposed on the external surface of the anode and secured thereto, said brushes being rotated as the anode rotates and sweeping radially over the inner surface of the cathode;

means for rotating the axle; and means for introducing a flow of water containing dissolved salt between the anode and cathode.

2. The device of claim 1 wherein the brushes are straight teflon blades mounted on the anode at an acute angle with respect to the axis of the anode, whereby water under pressure that is introduced between the cathode and anode flows against the brushes and causes the anode and axle to rotate.

3. The device of claim 2 wherein an electric motor rotates the axle.

4. The device of claim 3 wherein the anode is a titanium shell coated with platinum.

5. The device of claim 4 wherein the distance between the anode and the cathode is ⅛ inch.

* * * * *